United States Patent
Kim

(10) Patent No.: US 9,919,579 B2
(45) Date of Patent: Mar. 20, 2018

(54) AIR CONDITIONING SYSTEM FOR DRIVER'S SEAT AND METHOD OF CONTROLLING AIR CONDITIONING OF SEAT

(71) Applicant: Hyundai Motor Company, Seoul (KR)

(72) Inventor: Sang Jun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 153 days.

(21) Appl. No.: 14/958,477

(22) Filed: Dec. 3, 2015

(65) Prior Publication Data

US 2017/0008369 A1   Jan. 12, 2017

(30) Foreign Application Priority Data

Jul. 10, 2015  (KR) .................. 10-2015-0098622

(51) Int. Cl.
  *B60H 1/00* (2006.01)
  *G05B 15/02* (2006.01)
  *B60N 2/56* (2006.01)

(52) U.S. Cl.
  CPC ..... *B60H 1/00478* (2013.01); *B60H 1/00285* (2013.01); *B60N 2/5628* (2013.01); *G05B 15/02* (2013.01); *B60H 1/00378* (2013.01); *B60H 2001/003* (2013.01)

(58) Field of Classification Search
  CPC ............ B60H 1/00478; B60H 1/00285; B60H 1/00378; B60H 1/00678; B60H 1/00735; B60H 1/00835; B60H 1/00564; B60H 2001/00928; G05B 15/02
  USPC ..................................................... 62/3.3, 3.7
  See application file for complete search history.

(56) References Cited

U.S. PATENT DOCUMENTS

| | | | |
|---|---|---|---|
| 2007/0035162 A1* | 2/2007 | Bier | B60H 1/00285 297/180.15 |
| 2007/0234742 A1* | 10/2007 | Aoki | B60H 1/00285 62/3.3 |
| 2008/0033518 A1* | 2/2008 | Rousso | A61F 7/10 607/112 |

FOREIGN PATENT DOCUMENTS

| | | |
|---|---|---|
| EP | 2 210 751 B1 | 4/2014 |
| JP | 5-623 A | 1/1993 |
| JP | 2006-218902 A | 8/2006 |
| JP | 2013-189182 A | 9/2013 |
| KR | 2000-0039642 A | 7/2000 |
| KR | 10-2006-0106507 A | 10/2006 |
| KR | 10-2008-0051412 A | 6/2008 |
| KR | 10-2011-0019469 A | 2/2011 |
| KR | 10-2012-0064439 A | 6/2012 |

(Continued)

*Primary Examiner* — Mohammad M Ali
(74) *Attorney, Agent, or Firm* — Morgan, Lewis & Bockius LLP

(57) ABSTRACT

An air conditioning system for a driver's seat may include an eva-core and a blower; ducts extended to supply cold air blown by the blower to respective parts of a driver's seat; a thermoelectric element cooperatively controlled with an air conditioner of a vehicle, in which coolant water passes through a heat absorbing surface, so that the coolant water cooled by heat exchange is supplied to the driver's seat through a duct after air supplied by the blower is cooled in a heat exchange unit, and a heat emitting surface is in contact with a radiator to emit heat and generate cold air; and a distributor configured to selectively supply the cold air generated by the thermoelectric element to the respective parts of the driver's seat through the ducts.

19 Claims, 7 Drawing Sheets

(56) References Cited

FOREIGN PATENT DOCUMENTS

KR    10-2013-0080243 A    7/2013

\* cited by examiner

AIR CONDITIONING SYSTEM FOR DRIVER'S SEAT AND METHOD OF CONTROLLING AIR CONDITIONING OF SEAT

CROSS-REFERENCE TO RELATED APPLICATION

The present application claims priority to Korean Patent Application No. 10-2015-0098622 filed on Jul. 10, 2015, the entire contents of which are incorporated herein by reference.

BACKGROUND

Technical Field

The present disclosure relates to an air conditioning system for driver's seat and a control method thereof. More particularly, it relates to an air conditioning system for driver's seat, which improves fuel efficiency by using a thermoelement cooperatively controlled with heat, air ventilation, and cooling (HVAC) of a vehicle for a driver of a truck, and a control method thereof.

Background Art

In general, a driver stands by for a long time in a state where an engine of a truck is stopped for loading and uploading, and it is necessary to operate an air conditioning system to reduce driver's fatigue due to the heat even during the stand-by time.

A truck travels a long distance while loading a lot of cargo, so that fuel cost consumed is high, and a decrease of the fuel cost is directly connected to profit of a driver, so that the driver is particularly sensitive to fuel efficiency, and the driver hesitates to operate the air conditioning system only for himself/herself to decrease fuel cost.

Accordingly, a technology of auxiliarily applying a thermoelement using a Peltier effect to a driver's seat in the HVAC of a vehicle is suggested.

As an example of the related art, Korean Patent Application Laid-Open No. 10-2006-0106507 (published on Oct. 12, 2006) discloses an air conditioning system for a seat of a vehicle, including, as schematically illustrated in FIG. 1, a seat duct 120 communicating an air blower 110 of an air conditioning system of a front seat and a vehicle seat 100, a door 116 independently controlling an opening degree of the seat duct 120, and at least one thermoelectric element modules 130 installed in the seat duct 120 to heat exchange flowing air, in which the air blower 110 is provided with a bypass passage 114 branched from an outlet 112 discharging air to an air conditioning case, an inlet of the seat duct 120 is connected to the bypass passage 114, the door 116 adjusting an opening degree of the seat duct 120 is installed in the bypass passage 114, so that air may be selectively blown from the air blower 110 to the vehicle seat 100, a ventilation path 106 for blowing air, which is blown through the air blower 110 and the seat duct 120, to a back and a hip of a passenger is installed in a seat cushion 104 and a back part of a chair 102 of the seat 100 of the vehicle, and an outlet of the seat duct 120 is connected to the ventilation path 106.

As another example, Korean Patent No. 10-1241160 (granted on Mar. 4, 2013) filed by the applicant of the present invention discloses an air cooling, heating, and ventilating seat module of a vehicle, including: a blower unit including a housing; a thermoelectric module including a case installed inside the housing, and a thermoelectric semiconductor device embedded in the case so that an internal space of the case may be divided into a cool air flow path and a warm air flow path; and a separator connected to a side of the thermoelectric module to maximize the amount of absorption of condensate water generated by a temperature difference between the cool air flow path and the warm air flow path during execution of a cooling mode of the air cooling, heating, and ventilating seat of the vehicle, and having a bent portion.

However, the patent technologies in the related art have structural difficulty in that since the thermoelectric element is installed at the seat ducts, a condensate water removing structure for preventing a duct from being damaged due to condensate water generated due to condensation of water in the thermoelectric element needs to be provided at the duct, and since the thermoelectric element heats or cools air blown by the blower of the HVAC to be used only when an air conditioning system is operated, there are problems in that it is impossible to cool a driver's seat by solely using only the thermoelectric element in a state where an engine of a truck is turned off.

It is impossible to use a cooling function using the HVAC of the main air conditioning when the engine is turned off, and it is necessary to separately mount an anti-start air conditioner at a position of a sun roof of a truck cabin, so that it is impossible to mount the sun roof, and particularly, the anti-start air conditioner is far from a driver's seat in a large truck, so that energy loss is considerable. For example, when an outdoor temperature is 35° C., discharged air needs to be 19° C. to cool an entire cab by the anti-start air conditioner, but a temperature at a position of a driver is about 25° C., so that energy used is considerably wasted.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE DISCLOSURE

Various aspects of the present invention are directed to providing an air conditioning system for a driver's seat, which supplies cold air to a driver through existing heat, air ventilation, and cooling (HVAC) when an engine of a truck is being operated, but is controlled in connection with the HVAC to supply cold air to the driver by using an thermoelectric element when the engine is turned off.

Various aspects of the present invention are directed to providing a method of controlling air conditioning of a driver's seat, which selectively supplies cold air to a driver's seat by controlling a thermoelectric element of the air conditioning system for the driver's seat in connection with the HVAC.

In one aspect, the present disclosure provides an air conditioning system for a driver's seat, including: an eva-core and a blower installed outside a cab for the driver; ducts extended to closely supply cold air blown by the blower to a driver's seat through an armrest, a seat part, and a back part of a chair, and a neck portion of the back part of the chair; a thermoelectric element cooperatively controlled with an air conditioner of a vehicle, in which coolant water passes through a heat absorbing surface, so that the coolant water cooled by heat exchange is supplied to the driver's seat through a duct after air supplied by the blower is cooled in a heat exchange unit, and a heat emitting surface is in contact with a radiator to emit heat and generate cold air; a distributor configured to selectively supply the cold air generated by the thermoelectric element to the armrest, the seat part, and the back part of the chair, and the neck portion of the back part of the chair through the ducts; and a selection button configured to selectively supply cold air to the armrest, the seat part, and the back part of the chair, and the neck portion of the back part of the chair of the seat through the distributor.

In a preferred embodiment, the respective parts of the driver's seat may include an armrest, a seat part, a back part of a chair, and a neck portion.

In another preferred embodiment, the ducts may include ducts extended from a rear surface of a back of the driver's seat to communicate to exhaust ports formed at a seat part and a back part of a chair, a duct extended to communicate to an exhaust port formed at an armrest, and a duct extended to communicate to an exhaust port formed at a position of a neck portion of a headrest.

In still another preferred embodiment, the distributor may include a flap controlled by a motor therein to selectively open/close the ducts, and a position of the flap is controlled to a "conduction mode", in which cold air is supplied by opening a duct communicating to the exhaust ports of the seat part and the back part of a chair, a "conduction+convection mode", in which cold air is supplied by opening all of the duct communicating to the exhaust port of the armrest and the duct communicating to the exhaust port of the neck portion together with the duct communicating to the exhaust ports of the seat part and the back part of the chair, and a "convection mode", in which cold air is supplied by opening the duct communicating to the exhaust port of the armrest and the duct communicating to an exhaust port of the neck portion.

In yet another preferred embodiment, the eva-core and the blower may be installed outside a cab, and a Jabara type connection part may be provided at a portion, at which the duct passing through a locker from the eva-core and the blower is connected with the duct mounted at the seat to move the seat in front and rear directions for adjusting a position of a driver.

In another aspect, the present invention provides a method of controlling air conditioning of a driver's seat, which controls cooling of a driver's seat with a thermoelectric system and an air conditioner generating cold air to supply cold air to the driver's seat through ducts, the method including: operation S1 of operating a thermoelectric system; operation S3 of checking whether an engine is operated; operation S4 of supplying cold air to the driver's seat only by the thermoelectric system in an off-state of the engine; operation S10 of operating the air conditioner only in an on-state of the engine; operation S11 of checking whether an eco mode is operated; and operation S12 of automatically controlling an operation of the air conditioner according to a determination whether engine output is insufficient in operation 20 and a temperature obtained by measuring an indoor temperature in operation 30 when the eco mode is operated, and controlling cold air to be supplied to the driver's seat by the thermoelectric system when the eco mode is not operated.

In a preferred embodiment, in operation S4 in the off-state of the engine, the thermoelectric system may be controlled to be operated in a "conduction+convection mode", in which cold air is supplied by opening all ducts communicating to an armrest and a neck portion together with ducts communicating to a driver's seat part and a back part of a chair.

In another preferred embodiment, in operation S12, the thermoelectric system may be controlled to be operated in a "conduction mode", in which cold air is supplied through ducts communicating to a seat part and a back part of a chair.

In still another preferred embodiment, when the engine output is insufficient in operation S20, the air conditioner may be turned off in operation 21, when it is confirmed that the engine output is normal in operation S22, the air conditioner may be turned on in operation S23, and when the engine output is insufficient, the air conditioner may be controlled to maintain an off state.

In yet another preferred embodiment, when the measured temperature of an indoor area or a seat contact part is lower than a predetermined temperature in operation S30, the air conditioner may be turned off in operation S31, and when the measured temperature is higher than the predetermined temperature, the air conditioner may be operated in operation S32, and the method may be controlled to return to operation S10 of checking whether the eco mode is operated.

In still yet another preferred embodiment, the method may further include operation S5 of changing, by a driver, a mode selection of a ventilation direction selected in operation S4 to any one of "conduction", "convection", and "convection+conduction" modes.

In a further preferred embodiment, the method may further include operation S6 of checking whether an eco mode is operated subsequent to operation S5, in which when the eco mode is operated, whether the engine output is insufficient may be checked in operation S20.

According to the air conditioning system and method for a driver's seat and the method of controlling air conditioning of a seat according to the present invention, in a case where a driver stands by for a long time in a starting-off state in a vehicle, such as a truck or a trailer, it is possible to improve convenience of a driver by selectively supplying cold air generated by the thermoelectric element to a seat part, a back part of a chair, an armrest, and a neck portion of a driver's seat, reduce cost burden because it is not necessary to separately provide an anti-start air conditioner in the related art, provide minimum air conditioning even in a turned-off state of the air conditioner when engine output is insufficient by auxiliarily operating the thermoelectric element in connection with a general air conditioner provided in the vehicle, reduce fuel consumption due to an operation of the air conditioner, and improve energy efficiency.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain predetermined principles of the present invention.

Figure 1:
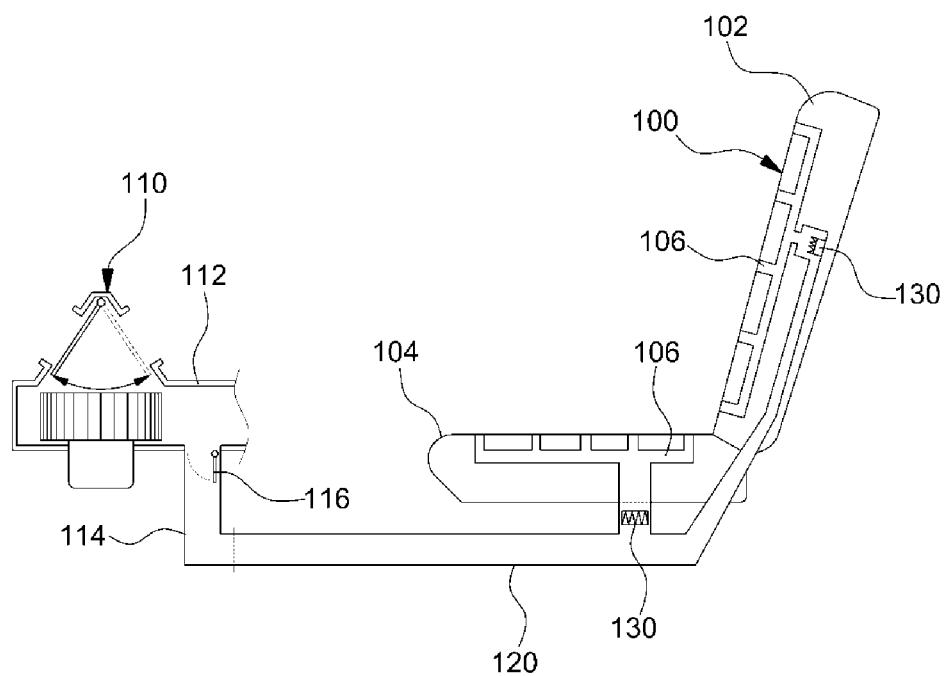
FIG. 1 is a schematic configuration diagram of an air conditioning system for a seat of a vehicle in the related art.

It should be understood that the appended drawings are not necessarily to scale, presenting a somewhat simplified representation of various features illustrative of the basic principles of the invention. The predetermined design features of the present invention as disclosed herein, including, for example, predetermined dimensions, orientations, locations, and shapes will be determined in part by the particular intended application and use environment.

In the figures, reference numbers refer to a same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but further various alternatives, modifications, equivalents and other embodiments, which may be included within the spirit and scope of the invention as defined by the appended claims.

Hereinafter, exemplary embodiments of a method of air conditioning a seat dedicated to a driver according to the present invention and an air conditioning system for a seat by the method will be described in more detail with reference to the accompanying drawings.

Figure 2:
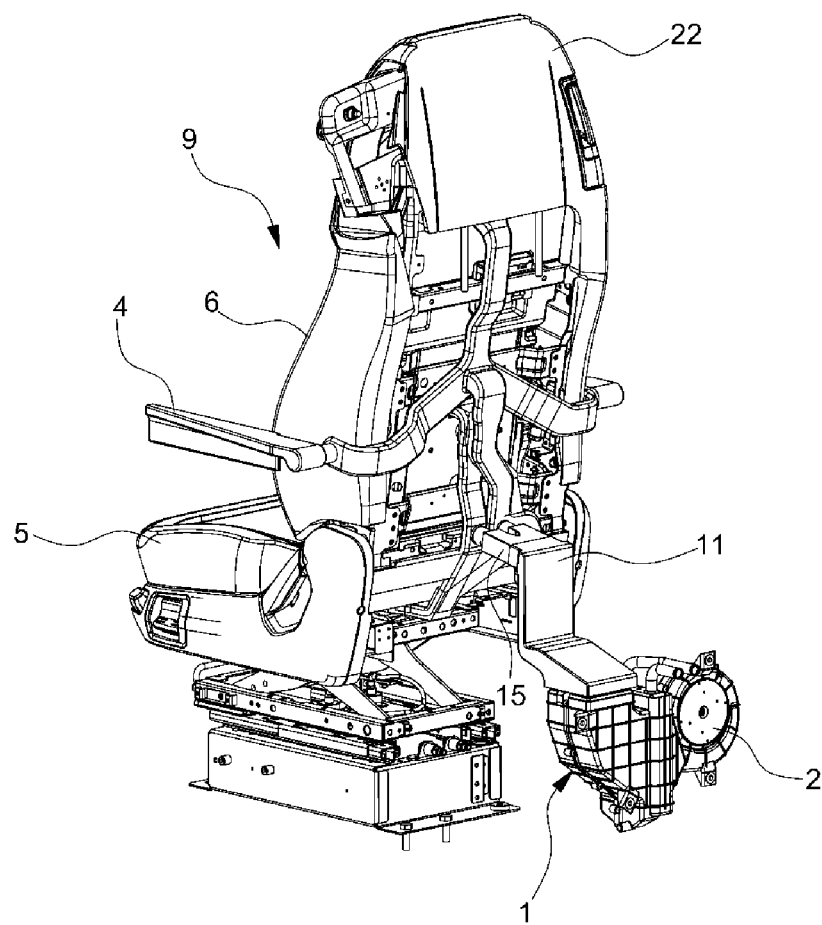
FIG. 2 is a perspective view illustrating a schematic configuration of an air conditioning system for a driver's seat of a truck according to the present invention.
Figure 3:
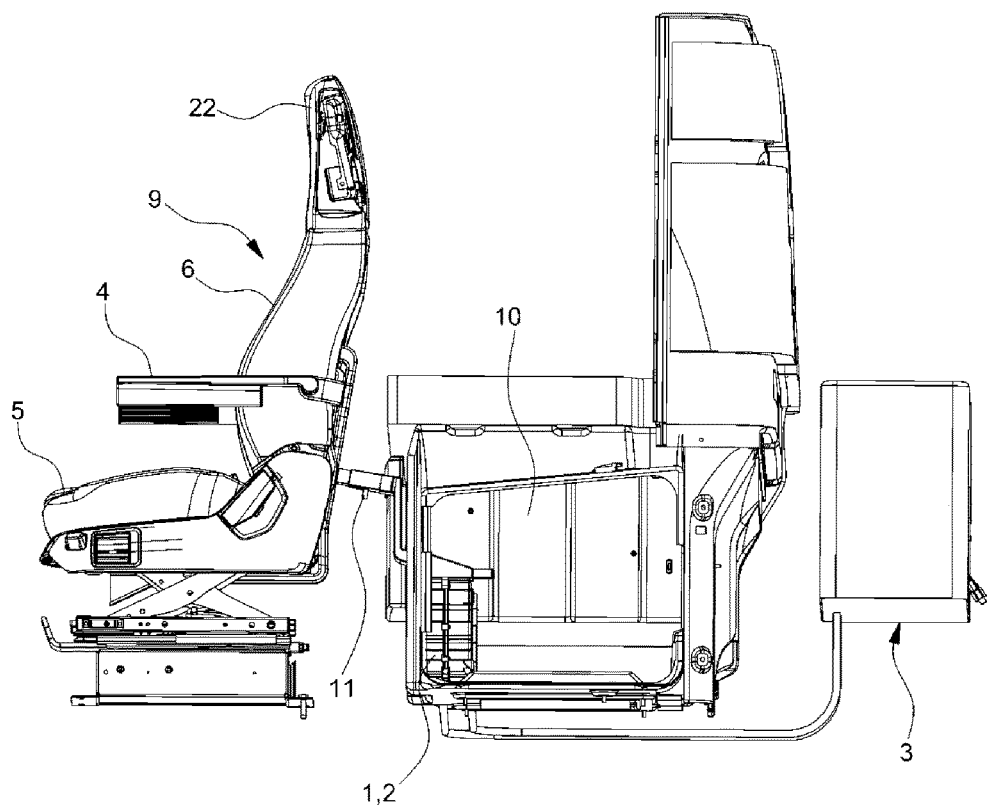
FIG. 3 is a lateral view illustrating a configuration of the air conditioning system for the driver's seat of FIG. 2.
Figure 4:
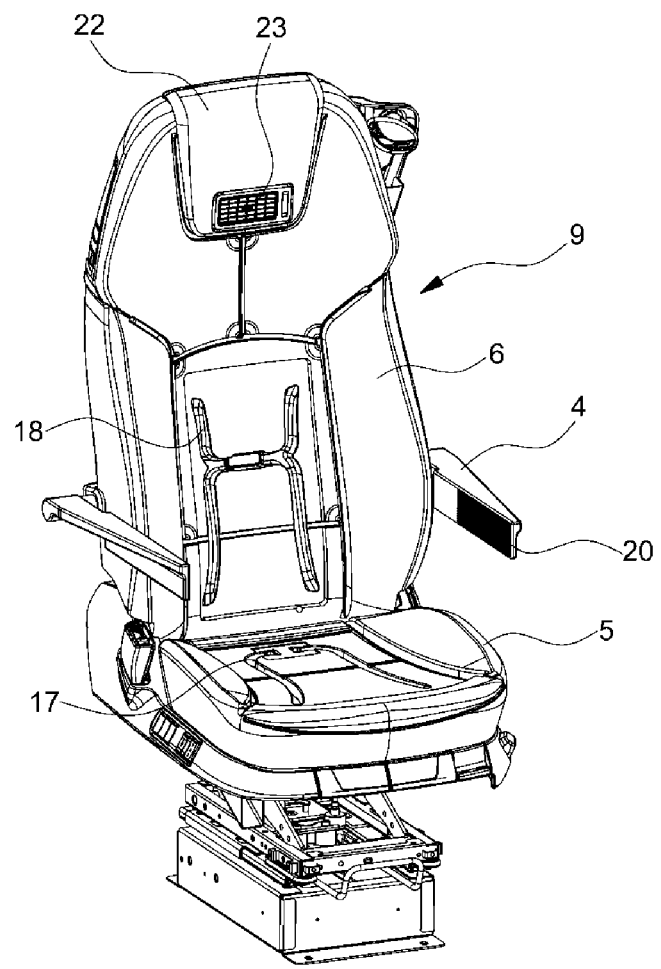
FIG. 4 is a perspective view of a seat illustrating a state, in which an outlet of a duct of the air conditioning system for the driver's seat of the truck of FIG. 2 is provided at a front surface of the seat.
Figure 5:
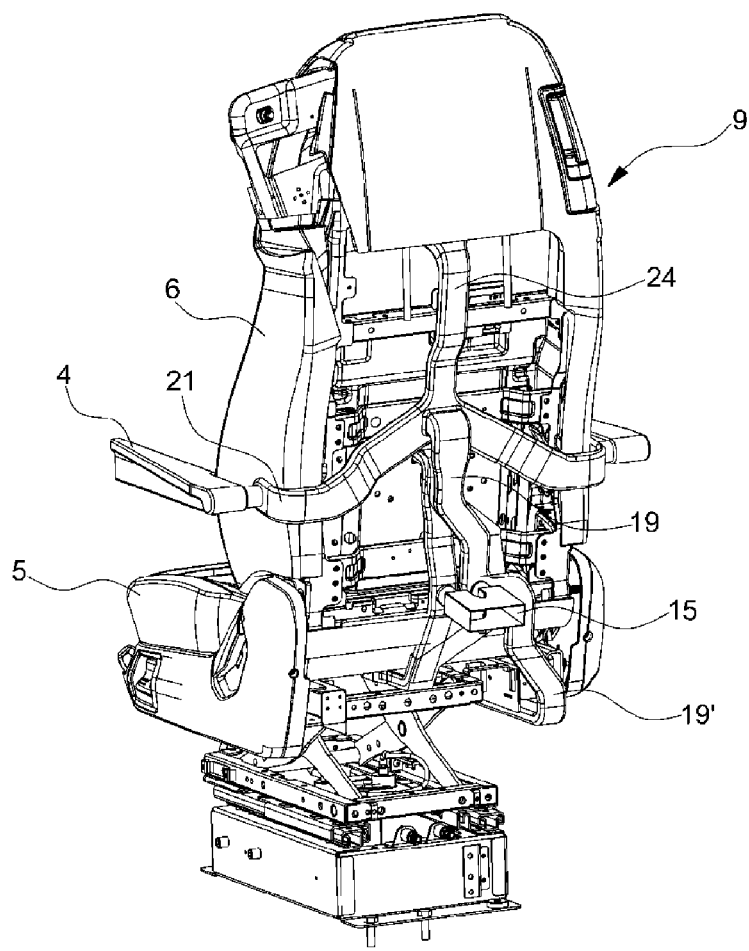
FIG. 5 is a perspective view illustrating a disposition configuration of a duct provided on a rear surface of the seat of the air conditioning system for the driver's seat of FIG. 2.

An air conditioning system for a driver's seat according to the present invention schematically illustrated in FIGS. 2 and 3 includes an eva-core 1, a blower 2, and ducts extended to an armrest 4, a seat part 5, and a back part of a chair 6 of a driver's seat in order to supply cold air blown by the blower.

An assembly 3 of a thermoelectric element and a radiator schematically illustrated in the drawing is disposed outside a cab of a truck, and coolant water passes through a heat absorbing surface in the thermoelectric element having the heat absorbing surface and a heat emitting surface, so that the coolant water cooled by heat exchange is supplied to the driver's seat through a duct after air supplied by the blower 2 from an indoor area or an outdoor area of a vehicle is cooled in a heat exchange unit, and the heat emitting surface of the thermoelectric element is in contact with the radiator to emit heat, thereby improving cooling efficiency. The cooling structure itself using the thermoelectric element is a publicly known technology, so that a detailed description thereof will be omitted.

The eva-core 1 and the blower 2 are installed inside the cab of the truck, and the assembly 3 of the thermoelectric element and the radiator is installed outside the cab, so that the duct is installed in the seat 9 while passing through a bottom of a locker 10 at a lower end of a truck bed from the assembly of the thermoelectric element and the radiator, thereby blocking noise and vibration from entering the indoor area and blocking heat of the radiator from entering the indoor area.

To move the seat in front and rear directions for adjusting a seat position for a driver, the duct 11 passing through the locker 10 is connected with a duct mounted at the seat 9 by a Jabara type connection part.

In FIGS. 4 to 8, a distributor 15 may be provided on a rear surface of the back of the seat 9 and the distributor 15 may include a flap 16 inside thereof, and the flap may be controlled to three positions by a motor to be opened/closed so that cold air generated by the thermoelectric element of the air conditioning system for the driver's seat of the present invention is selectively supplied through ducts extended to the seat part, the back part of the chair, the armrest part, and the like of the driver's seat.

That is, ducts 19 and 19' communicating to exhaust ports 17 and 18 formed at the seat part 5 and the back part of the chair 6, a duct 21 communicating to an exhaust port 20 formed at the armrest 4, and a duct 24 communicating to an exhaust port 23 formed at a position of a neck portion of the headrest 22 are disposed on the rear surface of the back of the seat 9. The distributor 15 is controlled by the motor to selectively open/close the ducts 19, 19', 21, and 24 by the flap 16. The ducts 19 and 19' supply cold air to the exhaust ports 17 and 18 of the seat part 5 and the back part of the chair 6, the duct 21 supplies cold air to the exhaust port 20 of the armrest, and the duct 24 supplies cold air to the exhaust port 23 located at the neck portion of the headrest.

Figure 6:
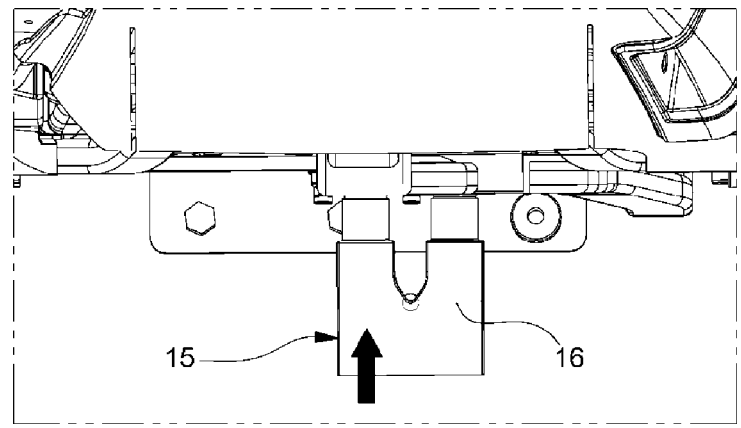
FIG. 6, FIG. 7, and FIG. 8 are diagrams illustrating operation states of a distributor, which supplies cold air by selectively communicating the duct of the air conditioning system for the driver's seat of FIG. 2 and an HVAC duct to a duct provided at a driver's seat.
Figure 7:
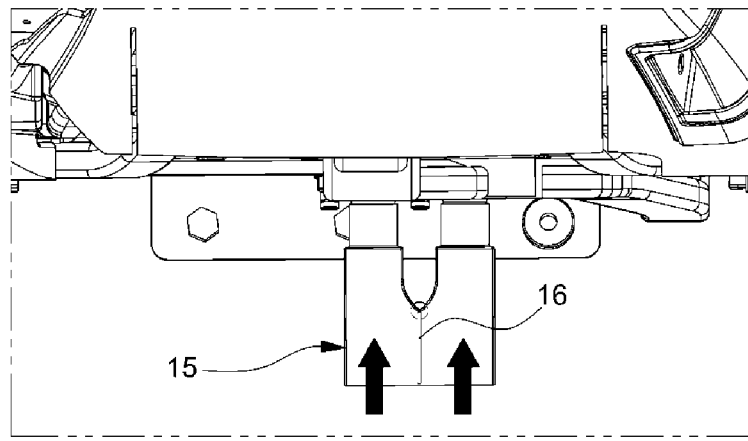
Figure 8:
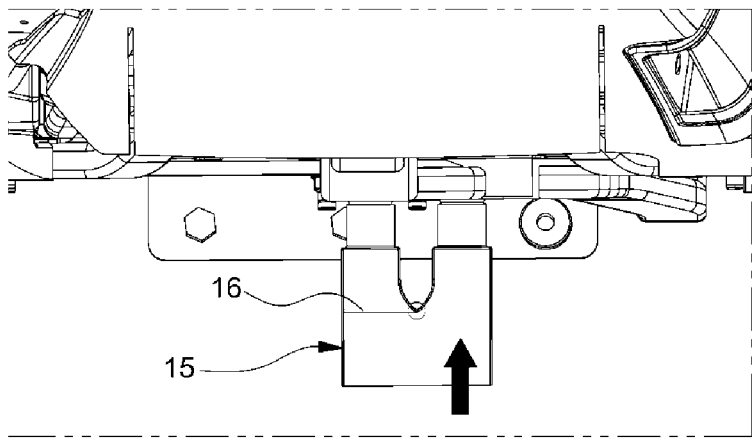

FIGS. 6, 7, and 8 illustrate an operation position, at which the flap disposed inside the distributor is controlled by the motor to selectively supply cold air of the HVAC and cold air supplied by the eva-core of the air conditioning system for the seat dedicated to the driver of the present invention through the ducts of the air conditioning system for the driver's seat of FIG. 2.

At the position of FIG. 6, the flap 16 closes a right side and opens a left side in the drawing to open the ducts 19 and 19' communicating to the exhaust ports 17 and 18 of the seat part 5 and the back part of the chair 6, so that cold air is supplied, and a mode is referred to as a "conduction mode". At the position of FIG. 7, cold air is supplied by opening all of the duct 21 communicating to the exhaust port 20 of the armrest 4 and the duct 24 communicating to the exhaust port 23 at the neck portion together with the ducts 19 and 19', and a mode is referred to as a "conduction+convection mode". At the position of FIG. 8, cold air is supplied by opening the duct 21 communicating to the exhaust port 20 of the armrest 4 and the duct 24 communicating to the exhaust port 23 at the neck portion, and a mode is referred to as a "convection mode".

Although not illustrated in the drawing, a temperature sensor is provided to measure temperatures of a seat contact portion and the indoor area, and engine output may be measured by, for example, a used torque meter or torque measuring sensor.

The cold air supplied by the eva-core 1 does not need to be lower than a temperature of cold air supplied by the HVAC, and is supplied with a temperature lower than a temperature of surrounding outside air by about 4 to 8° C., and the driver may sufficiently feel coolness even with a temperature difference of about 4 to 8° C. from the outside air, so that it is possible to save energy required for operating the air conditioning system for the driver's seat of the present invention.

Figure 9:
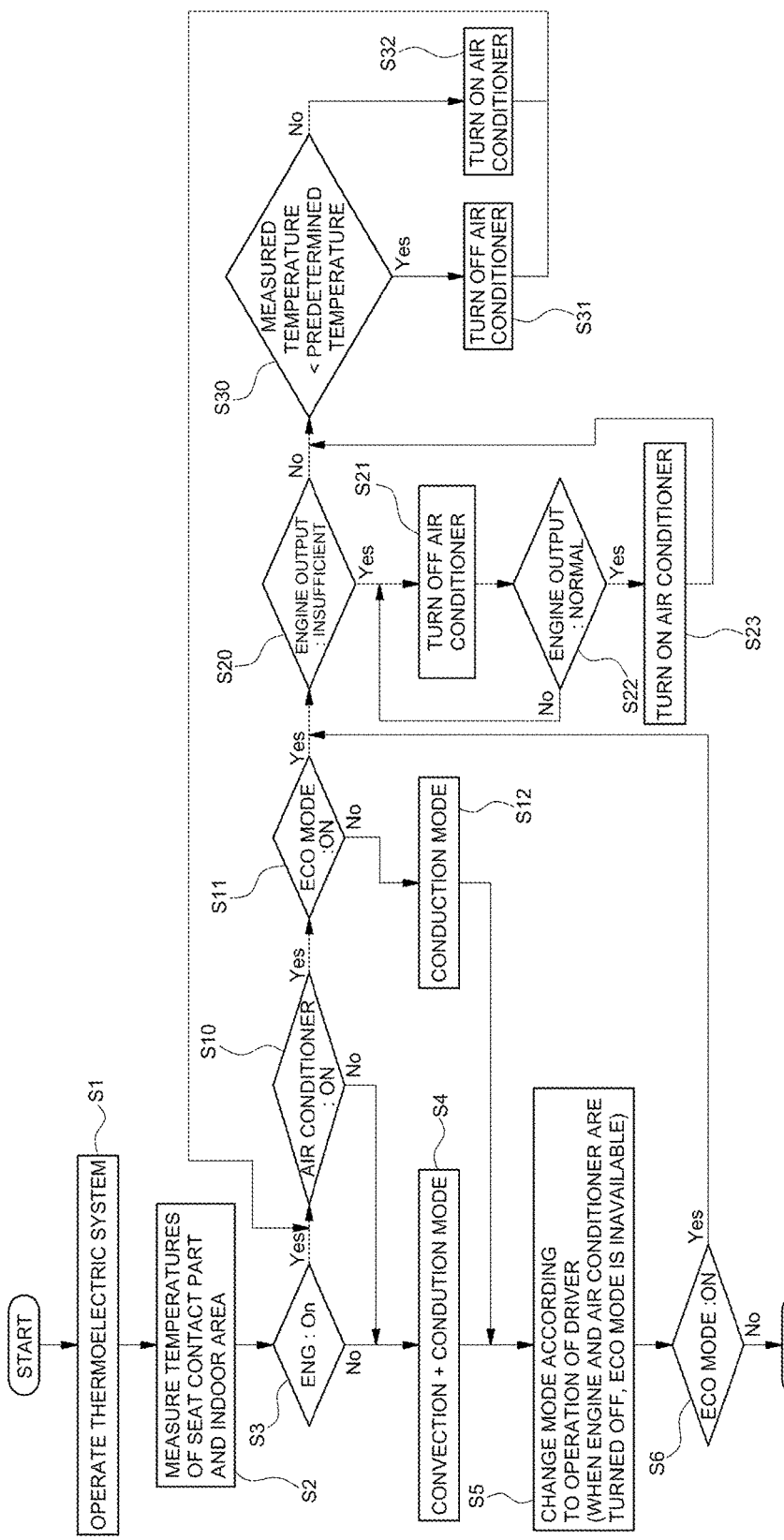
FIG. 9 is a flowchart of a method of air conditioning a driver's seat by controlling the air conditioning system for the driver's seat in connection with the HVAC according to the present invention.

FIG. 9 illustrates a method of air conditioning driver's seat, which controls the air conditioning system for the driver's seat of the truck according to the present invention in relation with the HVAC.

The air conditioning system for the driver's seat of the truck according to the present invention is operated when a driver presses a start button, and operates the thermoelectric element in operation S1 and measures temperatures of the seat contact portion and an indoor area in operation S2.

Then, the air conditioning system determines whether the engine is in an on-state in operation S3, and when the engine is in an off-state, the air conditioning system makes cooled air generated by the thermoelectric element flow toward the seat part, the back part of the chair, the armrest, and the neck portion by operating the flap of the distributor in the convection+conduction mode in operation S4. In operation S5, the driver may change a mode selection of a ventilation direction selected in operation S4. Then, the air conditioning system checks whether the mode is an eco mode in operation S6, and when the mode is not the eco mode, the air conditioning system terminates the operation. In the eco mode, the thermoelectric element is cooperatively operated with the air conditioner, so that fuel consumption according to the operation of the air conditioner is decreased, and the eco mode will be described in detail below.

When the engine is in the on-state in operation S3, the air conditioning system determines whether the air conditioner is in an on-state in operation S10, and when the air conditioner is in an off-state, the operation is connected to operation S4 to perform subsequent operations, and when the air conditioner is in the on-state, the air conditioning system checks whether the mode is the eco mode in operation S11, and when the mode is not the eco mode, the flap of the distributor is controlled in the conduction mode to make cold air flow to the seat part and the back part of the chair in operation S12, and then the operation is connected to operation S5 of selecting the ventilation mode.

When it is determined that the mode is the eco mode in operation S11, in operation S20, the air conditioning system determines whether engine output is insufficient, such as a case where the vehicle enters an uphill road, when it is determined that the engine output is insufficient, the air conditioning system turns off the air conditioner in operation S21, and then checks whether the engine output is normal by checking the engine output in operation S22, and when the engine output is insufficient, the operation returns to operation S21 and the air conditioning system repeatedly performs operations S21 and S22, and when it is confirmed that the engine output is normal, the air conditioning system operates the air conditioner again in operation S23.

When the engine output is not insufficient, that is, is normal, in operation S20, the air conditioning system measures an indoor temperature, and compares a value of the measured indoor temperature with a predetermined temperature in operation S30, and when the measured temperature is lower than the predetermined temperature, the air conditioning system turns off the air conditioner in operation S31, and when the measured temperature is higher than the predetermined temperature, the air conditioning system operates the air conditioner in operation S32. Subsequently to operations S31 and S32, the operation returns to S10, and when the air conditioner is turned on, the operation goes to operation S11 of checking whether the eco mode is on, so that the air conditioning system repeatedly performs operations S11 to S32.

The air conditioning system for the driver's seat according to the present invention is terminated when the driver presses the start button (not illustrated) again, the selection of the ventilation mode performed by controlling a direction of the flap is performed by a ventilation mode selection button (not illustrated) disposed next to the start button, up and down arrow directions are for increasing or decreasing intensity of wind, the "eco mode", the "conduction mode", the "convection mode", and the "conduction+convection mode" displayed on a display are sequentially displayed whenever the driver presses a left-right arrow in a right direction, the "eco mode", the "conduction mode", the "convection mode", and the "conduction+convection mode" are displayed in a reverse order whenever the driver presses the left-right arrow in a left direction, and when the driver presses a center portion of the button in the selected mode, the mode is selected.

As described above, the air conditioning system for the driver's seat of the present invention and the control method thereof supply cold air generated by the thermoelectric element close to the driver's seat through the seat part, the back part of the chair, the armrest, and the like of the driver's seat even during stand-by in a vehicle, such as a truck or a trailer, in which a driver frequently stands by in a starting-off state, to give a feeling of coolness to the driver, thereby decreasing fatigue of the driver, make the air conditioner and the thermoelectric element be cooperatively operated in the eco mode in a state where the engine is operated, so that the air conditioner is controlled to be automatically turned on/off according to an engine output state, auxiliarily supply cold air by the thermoelectric element close to the driver's seat, thereby decreasing an air conditioner operation time for cooling the driver, minimize fuel consumption according to the operation of the air conditioner, thereby decreasing the amount of fuel consumption, and do not require an installation of a high-cost and anti-start air conditioner in the related art, thereby reducing cost and decreasing weight of the cab.

The present invention may be used to be cooperatively operated with an existing air conditioner for cooling a driver of a vehicle, such as a truck or a trailer, in which the driver stands by for a long time in a starting-off state.

For convenience in explanation and accurate definition in the appended claims, the terms "upper", "lower", "inner" and "outer" are used to describe features of the exemplary embodiments with reference to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioning system for a driver's seat, comprising:
   an enclosure connecting a blower;
   ducts extended to supply cold air blown by the blower to respective parts of the driver's seat;
   a thermoelectric element cooperatively controlled with an air conditioner of a vehicle, wherein coolant water passes through a heat absorbing surface of the thermoelectric element, so that the coolant water cooled by heat exchange is supplied to the driver's seat through a duct after air supplied by the blower is cooled in a heat exchange unit, and a heat emitting surface of the thermoelectric element is in contact with a radiator to emit heat and generate cold air; and
   a distributor configured to selectively supply the cold air generated by the thermoelectric element to the respective parts of the driver's seat through the ducts,
   wherein the air conditioner and the thermoelectric element are cooperatively operated in an economical mode of operation in a state where an engine is operated.

2. The air conditioning system of claim 1, wherein the respective parts of the driver's seat include an armrest, a seat part, a back part of a chair, and a neck portion of a headrest.

3. The air conditioning system of claim 1, wherein the ducts include ducts extended from a rear surface of a back of the driver's seat to communicate to a seat part and a back part of a chair, a duct extended to communicate to an armrest, and a duct extended to communicate to a position of a neck portion of a headrest.

4. The air conditioning system of claim 3, wherein the distributor controls a flap to selectively open or close the ducts.

5. The air conditioning system of claim 3, further comprising ducts supplying cold air to exhaust ports of a seat part and a back part of the chair, a duct supplying cold air to an exhaust port of the armrest, and a duct supplying cold air to an exhaust port located at the neck portion of the headrest.

6. The air conditioning system of claim 1, wherein the distributor controls supply of cold air in a "conduction mode", in which cold air is supplied by opening a duct communicating to exhaust ports of a seat part and a back part of a chair, a "conduction+convection mode", in which cold air is supplied by opening all of a duct communicating to an exhaust port of an armrest and a duct communicating to an exhaust port of a neck portion together with the duct communicating to the exhaust ports of the seat part and the back part of the chair, and a "convection mode", in which cold air is supplied by opening the duct communicating to the exhaust port of the armrest and the duct communicating to the exhaust port of the neck portion.

7. The air conditioning system of claim 6, further comprising:
   a selection button configured to select the modes to selectively supply cold air to the respective parts of the driver's seat through the distributor.

8. The air conditioning system of claim 1, wherein the enclosure and the blower are installed outside a cab, and a collapsible connection part is provided at a portion, at which the duct passing through a locker from the enclosure and the blower is connected with the duct mounted at the seat, to move the seat in front and rear directions for adjusting a position of a driver.

9. A method of controlling air conditioning of a driver's seat, which controls cooling of a driver's seat with a thermoelectric system and an air conditioner generating cold air to supply cold air to the driver's seat through ducts, the method comprising:
   operation S1 of operating a thermoelectric system;
   operation S3 of checking whether an engine is operated;
   operation S4 of supplying cold air to the driver's seat only by the thermoelectric system in an off-state of the engine;
   operation S10 of operating the air conditioner only in an on-state of the engine;
   operation S11 of checking whether an economical mode of operation is operated; and
   operation S12 of automatically controlling an operation of the air conditioner according to a determination whether engine output is insufficient in operation 20 and a temperature obtained by measuring an indoor temperature in operation 30 when the economical mode of operation is operated, and controlling cold air to be supplied to the driver's seat by the thermoelectric system when the economical mode of operation is not operated,
   wherein the air conditioner and the thermoelectric system are cooperatively operated in an economical mode of operation in a state where the engine is operated.

10. The method of claim 9, wherein in the operation S4 in the off-state of the engine, the thermoelectric system is controlled to be operated in a "conduction+convection mode", in which cold air is supplied by opening all of a duct communicating to an armrest and a duct communicating to a neck portion together with ducts communicating to the driver's seat part and a back part of a chair.

11. The method of claim 9, wherein in the operation S12, the thermoelectric system is controlled to be operated in a "conduction mode", in which cold air is supplied through ducts communicating to a seat part and a back part of a chair.

12. The method of claim 9, wherein when the engine output is insufficient in the operation S20, the air conditioner is turned off in operation 21, when it is confirmed that the engine output is normal in operation S22, the air conditioner is turned on in operation S23, and when the engine output is insufficient, the air conditioner is controlled to maintain an off state.

13. The method of claim 12, wherein when the measured temperature of the indoor area or the seat contact part is lower than a predetermined temperature in operation S30, the air conditioner is turned off in operation S31, and when the measured temperature is higher than the predetermined temperature, the air conditioner is operated in operation S32, and the method is controlled to return to the operation S10 and then go to the operation S11 of checking whether the economical mode of operation is operated.

14. The method of claim 9, further comprising:
   operation S5 of changing, by a driver, a mode selection of a ventilation direction selected in the operation S4 to any one of "conduction", "convection", and "convection+conduction" modes.

15. The method of claim 14, further comprising:
   operation S6 of checking whether an economical mode of operation is operated subsequent to operation S5,
   wherein when the economical mode of operation is operated, whether the engine output is insufficient is checked in the operation S20.

16. A method of controlling air conditioning of a driver's seat, comprising:
- operation S1 of operating a thermoelectric element by pressing a start button by a driver;
- operation S3 of determining whether an engine is in an on-state;
- operation S4 of making cooled air generated by the thermoelectric element flow toward a seat part, a back part of a chair, an armrest, and a neck portion by operating a flap of a distributor in a convection+conduction mode when the engine is in an off-state;
- operation S6 of checking whether an economical mode of operation is operated, and when the economical mode of operation is not operated, returning to operation S3 and repeatedly performing the operations S3, S4, and S6;
- operation S10 of determining whether an air conditioner is in an on-state when the engine is in the on-state in the operation S3, and connecting to the operation S4 and performing subsequent operations when the air conditioner is in an off-state;
- operation S11 of checking whether the economical mode of operation is operated when the air conditioner is in the on-state in the operation S10;
- operation S20 of determining whether engine output is insufficient when it is determined that the economical mode of operation is operated in operation S11;
- operation S21 of turning off the air conditioner when it is determined that the engine output is insufficient in the operation S20, and then operation S22 of checking whether the engine output is normal;
- operation S23 of returning to operation S21 and repeatedly performing operations S21 and S22 when the engine output is insufficient, and when it is checked that the engine output is normal, operating the air conditioner again;
- operation S30 of measuring an indoor temperature and comparing a value of the measured indoor temperature with a predetermined temperature when the engine output is not insufficient in the operation S20; and
- operation S31 of turning off the air conditioner when the measured temperature is lower than the predetermined temperature, and operation S32 of operating the air conditioner when the measured temperature is higher than the predetermined temperature.

17. The method of claim 16, wherein after performing the operations S31 and S32, the method returns to the operation 10 and then goes to the operation S11 again and the operations S11 to S30, S31 and S32 are repeatedly performed.

18. The method of claim 16, further comprising:
- operation S5 of changing, by a driver, a mode selection of a ventilation direction selected in the operation S4 to any one of "conduction", "convection", and "convection+conduction" modes.

19. The method of claim 18, wherein when the economical mode of operation is not operated in the operation S11, cold air flows to the seat part and the back part of the chair by controlling a flap of a distributor in a conduction mode in operation S12, and then the method returns to the operation S5 of selecting a ventilation mode.

* * * * *